(12) United States Patent
De La Cruz

(10) Patent No.: US 7,303,675 B2
(45) Date of Patent: Dec. 4, 2007

(54) BLISTER PROTECTION FOR SPIRAL WOUND ELEMENTS

(75) Inventor: Deborah De La Cruz, Vista, CA (US)

(73) Assignee: GE Osmonics, Inc., Minnetonka, MN (US)

( * ) Notice: Subject to any disclaimer, the term of this patent is extended or adjusted under 35 U.S.C. 154(b) by 390 days.

(21) Appl. No.: 11/015,186

(22) Filed: Dec. 17, 2004

(65) Prior Publication Data

US 2005/0121380 A1    Jun. 9, 2005

Related U.S. Application Data

(63) Continuation-in-part of application No. PCT/US2003/019582, filed on Jun. 20, 2003.

(60) Provisional application No. 60/390,451, filed on Jun. 21, 2002.

(51) Int. Cl.
*B01D 63/10* (2006.01)
*B01D 61/00* (2006.01)

(52) U.S. Cl. ............ 210/321.76; 210/321.85; 210/650; 210/652; 156/290; 156/325; 156/330; 156/334

(58) Field of Classification Search ............ None
See application file for complete search history.

(56) References Cited

U.S. PATENT DOCUMENTS

| | | | |
|---|---|---|---|
| 4,454,176 A | 6/1984 | Buckfelder et al. | 427/246 |
| 4,842,736 A | 6/1989 | Bray et al. | 210/321.61 |
| 5,128,037 A | 7/1992 | Pearl et al. | 210/321.74 |
| 5,147,541 A | 9/1992 | McDermott, Jr. et al. | 210/321.74 |
| 6,068,771 A | 5/2000 | McDermott et al. | 210/321.83 |
| 6,156,680 A | 12/2000 | Goettmann | 442/344 |
| 2003/0034116 A1 | 2/2003 | Simonetti | 156/185 |
| 2003/0034293 A1 | 2/2003 | Simonetti | 210/321.74 |
| 2004/0099598 A1 | 5/2004 | Cheng | 210/321.85 |

FOREIGN PATENT DOCUMENTS

| | | |
|---|---|---|
| EP | 0 253 945 | 4/1990 |
| JP | 199610137558 | 5/1998 |
| WO | WO 00/44481 A1 | 8/2000 |

*Primary Examiner*—Krishnan S. Menon
(74) *Attorney, Agent, or Firm*—Fitch, Even, Tabin & Flannery

(57) ABSTRACT

A method for preventing osmotic blistering in spirally-wound elements of semipermeable membrane sheet material (14) by applying an effective coating of a sealant (41, 43, 45) to the upstream surface of such membrane material in regions where such potential for blistering exists and thereby preventing the permeation of liquid into the surface of the semipermeable membrane in these regions.

14 Claims, 2 Drawing Sheets

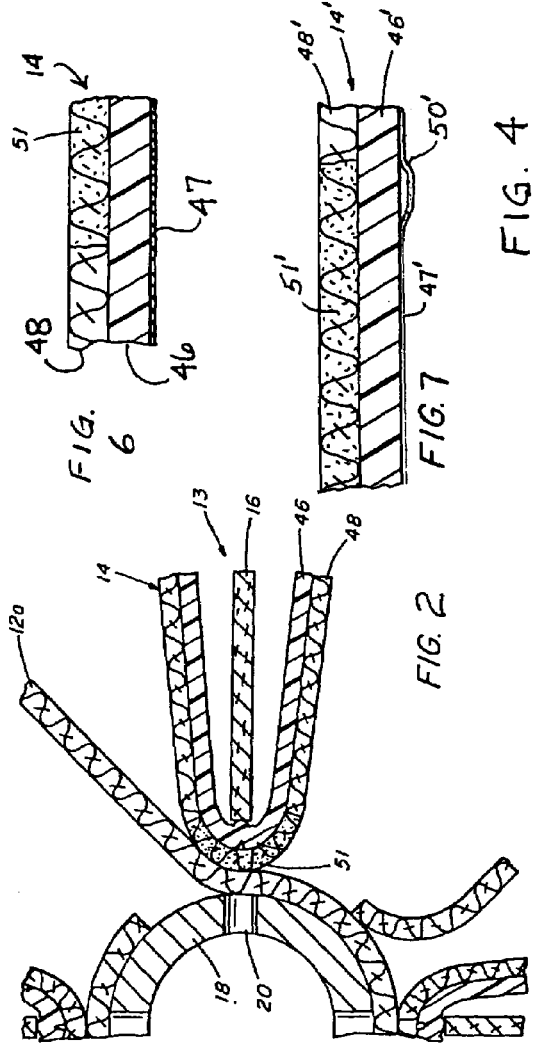
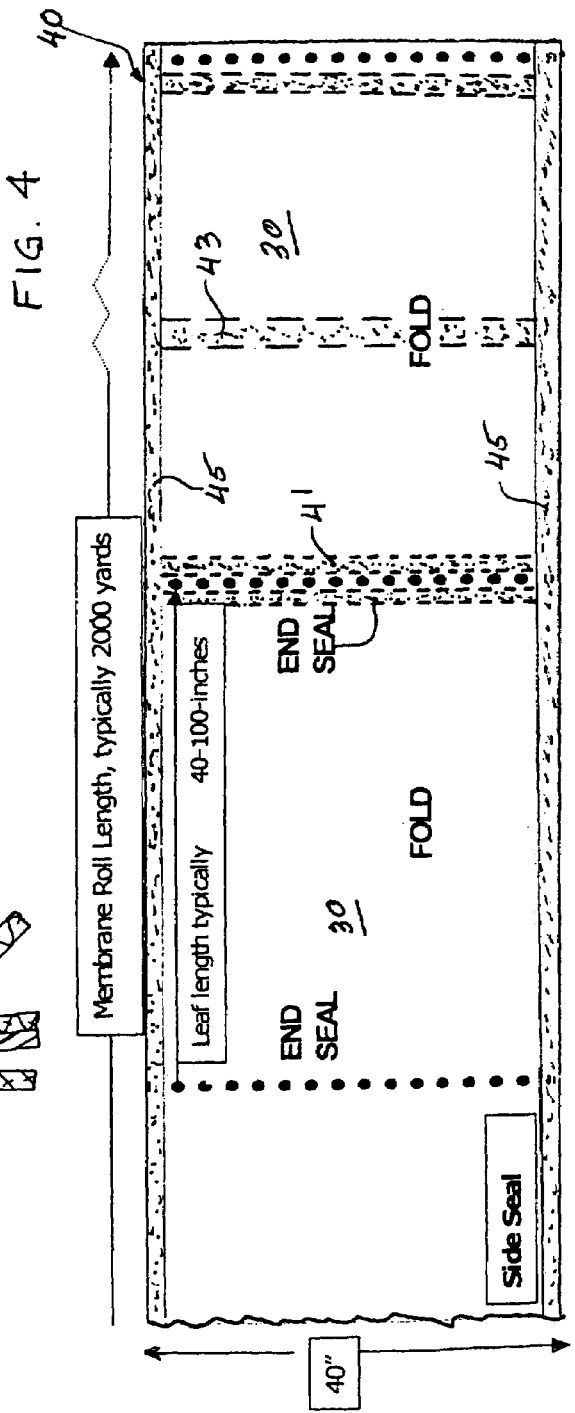

BLISTER PROTECTION FOR SPIRAL WOUND ELEMENTS

This application is a continuation-in-part of International Application Serial No. PCT/US2003/019582, filed Jun. 20, 2003, which claims priority from U.S. Provisional Application Ser. No. 60/390,451, filed Jun. 21, 2002, the disclosures of both of which applications are incorporated herein by reference.

The invention generally relates to spirally-wound elements made of sheet-like semipermeable membrane material, and more particularly relates to methods of making spirally-wound cross flow membrane elements utilizing sheets of semipermeable membrane material sheets, which are folded upon themselves to create leaves that are spirally wound about a central porous tube.

BACKGROUND OF THE INVENTION

The invention is directed generally to spirally-wound constructions for use in cross flow separation operations; these constructions are variously referred to as elements, cartridges and modules. More particularly, the invention is directed to such spirally-wound elements made of leaves in the form of folded sheets of polysulfone or polyethersulfone UF membranes, which may optionally carry interfacially created, more selective semipermeable membranes; these leaves are interleaved with sheets of feed passageway-providing material and permeate carrier material. Such elements have traditionally been made by strategically applying adhesive (referred to in the trade as "gluing") to assemblages or lay-ups of such sheet-like materials while rolling about a porous tube to create a spirally-wound construction.

The earliest semipermeable membranes used for such separation operations were of the asymmetric, cellulose diacetate/triacetate type; however, in the past three decades, these membranes have been supplanted for many separation processes by asymmetric polysulfone or polyethersulfone UF membranes and by composite or thin film membranes wherein a more highly permselective membrane has been coated onto a polysulfone base membrane or porous support. A dense active discriminating layer is often interfacially formed upon a more porous supporting or base layer; the dense layer is often a condensation polymer, such as a polyamide, which provides particularly desirable semipermeable characteristics. Although the more porous supporting layer can be any suitable polymeric material, polysulfones have frequently been used. Such a polysulfone layer having the desired pore size to support such an ultrathin interfacial layer is frequently cast upon a thin layer of nonwoven polyester felt backing or scrim material with which the polysulfone layer generally becomes very tightly attached. In the traditional spiral-wound construction, membrane leaves are formed by folding a long sheet having twice the final leaf length, and in some separations, polysulfone and polyethersulfone UF membrane, as well as composite sheet materials, have experienced occasional difficulties in the fold area where the UF membrane and/or thin interfacial membrane is folded upon itself. After use for some time, the fold region of the semipermeable membrane was found to have buckled and cracked, resulting in some leakage of feed solution being fed to the element through these cracks into the permeate carrier. Often a blister will form in the fold region or along edge regions of the membrane leaves, trapping feed solution or cleaning solution under the surface of the membrane; thus, even if the cracks do not leak through to the permeate side, they may create an unsanitary spot where bacteria can be harbored. Such is unsuitable in food and dairy process plants where products are being made for human consumption.

U.S. Pat. No. 4,842,736 recognized this problem at the fold and proposed an effective solution, teaching the application of flexible sealing material to the felt at the permeate output surface of the membrane material; such sealing material would penetrate and fill the interstices of the porous membrane support in the region of the fold eliminating flow in the region of the fold by blocking the output surface. Materials that were used for this purpose included polyurethane adhesives which were forced into the felt and then cured; alternatively, soft melt plastic ribbons were heated to essentially their melting point and driven into the interstices. A very similar solution to this problem of leakage at the fold was described in U.S. Pat. No. 5,147,541, and U.S. Patent Application No. 2004/0099598 further describes treatment along the fold line. U.S. Pat. No. 6,068,771 and U.S. Published Application No. 2003/0034293 disclose using vacuum to draw a polymeric adhesive into the edges of a spiral-wound membrane element.

Although these solutions solved the problem of leakage through cracking at a fold, it has been found that membrane leaf-folds which have been so treated to overcome the propensity for leakage through cracks may still experience other deficiencies when operated in environments where they are frequently subjected to harsh cleanings. This is particularly true in food and dairy installations where such spirally-wound elements are often cleaned daily, using cleaning solutions of a caustic or acidic character and/or which may contain high amounts of chlorine. In such regions where the downstream or permeate-output surfaces of such membrane sheet materials are sealed, e.g. in the fold regions, by a process such as one of those just mentioned above, caustic cleaners, for example, can penetrate through potential cracks, become absorbed in portions of the porous backing layers and sometimes create blisters by causing either the polysulfone to split from its substrate backing or the ultrathin layer to split from the polymeric porous base. Such regions also exist along the side and end edges of such membrane material where adhesive is traditionally applied so as to seal the edges of permeate carrier sheets (which provide the pathways adjacent each spirally disposed membrane leaf leading inward to the porous central collecting tube), and these seals will also prevent permeate passing through the active membrane surface in these edge regions from reaching the permeate carrier, as will also be the case in fold regions that have not cracked. It has now been found that liquids or solutions with relatively low osmotic pressure, e.g. DI rinse water, being pumped through the feed carrier windings will diffuse through or be absorbed within the semipermeable membrane in these edge areas, fill the porous region and sometimes cause local separation either of the polysulfone from its substrate or of the interfacial layer from the underlying polymeric base. This occurrence has now come to be referred to as osmotic blistering, and such blisters potentially occur along the glued edges of the membrane sheet lay-ups and in the region of the folds. When the elements are frequently cleaned and then rinsed with low osmotic pressure solutions, such as deionized water or the like, they will occasionally blister. Such blistering is unacceptable in the food and dairy industries, and a solution for this further problem has been sought for a number of years.

SUMMARY OF THE INVENTION

The invention provides a method for preventing osmotic blistering in spirally-wound elements of semipermeable membrane sheet material, which material includes a microporous selective membrane or a microporous base layer supporting a more discriminating polymeric layer, wherein the membrane material is assembled with adjacent sheet materials to create leaves. In instances where the membrane material is folded upon itself, its downstream or permeate output surface may have been routinely treated in the region of the fold to prevent leakage should subsequent cracking occur. It has now been found that the application of a sealant to the upstream or feed input surface of the membrane material at those locations where permeate flow through the backing or base is prevented from reaching a permeate carrier by adhesive/glue applied during rolling the elements provides a successful solution to the troubling problem of potential osmotic blistering, which blistering can potentially occur not only at blocked regions of the fold, but also along the longitudinal edges of these membrane material sheets and in the regions of the end seals, in traditionally constructed spirally-wound elements. The sealant used is preferably a polymeric one, such as a hot melt adhesive, or an adhesive that is cured by exposure to UV radiation, or an epoxy-like adhesive that sets fairly rapidly as a result of chemical reaction. As a result, the invention also provides improved spirally-wound liquid separation elements which are inherently resistant to osmotic blistering and are thus particularly well suited for use in the dairy and food processing industries.

In one particular aspect, the invention provides a method for preventing osmotic blistering in spirally-wound elements of semipermeable membrane sheet material in locations otherwise subject thereto, which method comprises applying a sealant to the upstream surface of the membrane sheet material in locations where the downstream surface thereof has been so treated that flow therethrough is prevented, which sealant prevents liquid from permeating into the membrane in such regions and potentially resulting in osmotic blistering.

In another particular aspect, the invention provides a method for preventing osmotic blistering in spirally-wound elements of folded semipermeable membrane sheet material, which folded material comprises a polysulfone or polyethersulfone UF membrane treating the downstream surface of said UF membrane in a region of the fold to prevent leakage therethrough as a result of subsequent cracking of the membrane, and applying a sealant to the upstream surface of the semipermeable membrane sheet material so as to create two rectangular active membrane surface regions bordered by sealed surface regions to prevent liquid from permeating into the membrane along edge surfaces and in the region of the fold and potentially causing blistering.

In a further particular aspect, the invention provides a method for making spirally wound semipermeable membrane elements from semipermeable membrane sheet material, which elements are resistant to osmotic blistering, which method comprises the steps of providing an extended length of the membrane sheet material, sufficient to provide a plurality of folded leaves for spiral winding, which material includes a supporting microporous base layer and a thin semipermeable discriminating layer having an upstream surface and a downstream surface, with its downstream surface being in contact with said base layer, applying a sealant pattern to the upstream surface of the discriminating layer along its longitudinal edges and at spaced apart locations along said extended length where each of said plurality of leaves would be folded and where they would end, which sealant is effective to prevent liquid from permeating through the discriminating layer in such locations, cutting said extended length into a plurality of panels for folding to create said leaves, treating a downstream surface of said base layer in each said fold region to prevent leakage therethrough should subsequent cracking of the discriminating layer occur during operation, folding each of said plurality of panels and inserting a sheet of porous feed material within the folded sheet to create one leaf, and winding said plurality of leaves spirally about a hollow central tube to create a cross-flow separation element.

In a yet further particular aspect, the invention provides a spirally wound liquid separation element which comprises a plurality of leaves of sheet-like semipermeable membrane material, with each said leaf being folded upon itself, a porous feed material sheet sandwiched between facing upstream surfaces of said folded leaf, porous permeate carrier material associated with and flanking said folded leaves, said membrane material having means treating the downstream surface thereof in a region of each fold to prevent leakage therethrough should cracking of the membrane subsequently occur during use, and a sealant layer coating the upstream surface of the membrane material along its side and end edge surface regions and in the region of each fold to prevent liquid that might cause osmotic blistering from permeating into the membrane in these regions.

BRIEF DESCRIPTION OF THE DRAWINGS

FIG. 2 is a view similar to FIG. 1 which is greatly enlarged and depicts a portion of a sandwich leaf adjacent the central tube, which leaf is made of folded sheet of membrane material.

FIG. 4 is a schematic plan view of membrane material of extended length showing delineations which mark individual leaves, such as that shown in FIG. 3, that will be cut from the material and a pattern of sealant application to the discriminating semipermeable surface thereof.

FIG. 6 is an enlarged fragmentary cross-sectional view taken generally along the line 6-6 of FIG. 3.

FIG. 7 is a view similar to FIG. 6 showing a prior art construction to illustrate the problem of osmotic blistering.

DETAILED DESCRIPTION OF THE PREFERRED EMBODIMENTS

Figure 1:
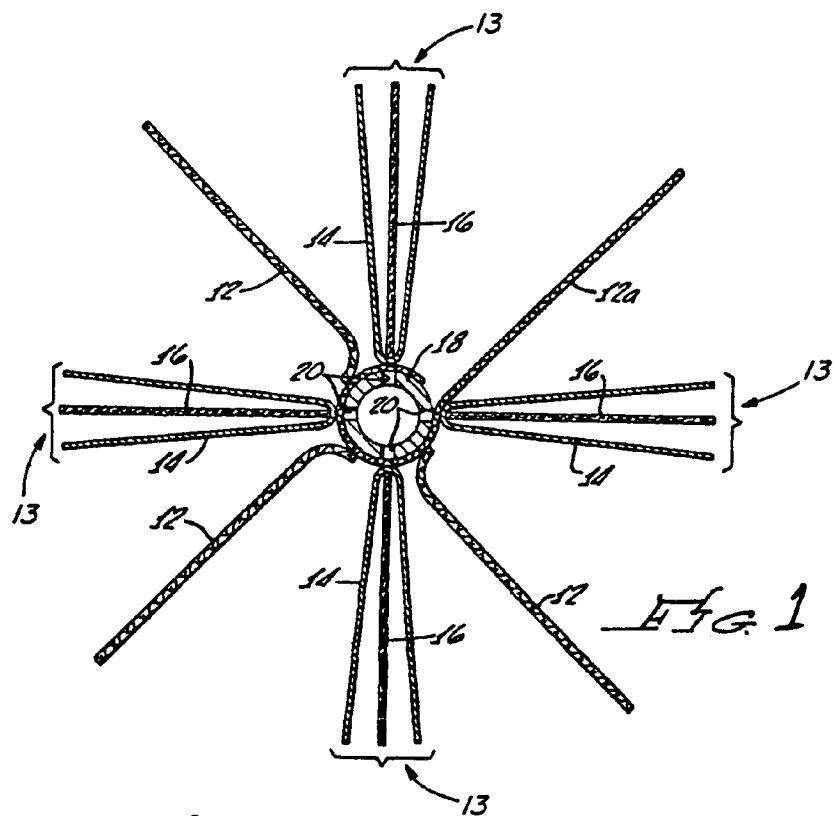
FIG. 1 is a cross-sectional view showing a membrane element embodying various features of the invention which illustrates an assemblage of sheet material prior to winding into an element.

It is often the case that spirally-wound semipermeable membrane elements may be subjected to relatively harsh cleaning conditions as often as twice a day in the dairy and some food processing industries to assure cleanliness and sanitation. Consistent with maintaining such standards, these installations, including the separation elements, are frequently inspected by the FDA inspectors who are alert to potential deficiencies that might be created in the elements, such as osmotic blistering of membranes. Detection of osmotic blistering will likely cause the certification of the product to be lowered to one suitable for animal feed only and, as such, needs to be avoided. As a result, the desirability of alleviating such potential problems became evident at an early date, and the present invention represents a surprisingly straightforward solution to this problem.

Very generally, the well known spirally-wound cross flow membrane element includes a wrapping of multiple groups of permeate carrier sheet material 12 and leaves 13 that constitute individual sandwiches wherein semipermeable membrane material 14 is folded about a feed carrier sheet 16; the wrapping is around a central tube 18 which serves as a permeate collection pipe. The sidewall of the central tube 18 can either be porous or provided with defined openings 20 through which the liquid can pass that has permeated through the semipermeable membranes and traveled inward in the permeate carrier sheets 12 to the tube, from which it is discharged via one or both ends as desired. As well known in this art of cross flow filtration, the feed liquid being treated enters one end of the spirally-wound element and flows axially therethrough, with a concentrate or brine exiting the opposite end. In its travel through the element from end to end, water or another permeating component will be separated and pass through the upstream permeselective surface of the membrane material and then through the felt or scrim layer upon which the membrane was cast until reaching the permeate carrier sheet 12; the remainder of the liquid feed flows axially toward the discharge end, growing continuously more concentrated as permeation occurs through the upstream surface area of the semipermeable membrane. Once the permeating liquid component reaches the permeate carrier sheeting 12, it then flows spirally inward therewithin until it reaches the porous central tube 18.

As depicted in FIGS. 1 and 2, an element is assembled from a plurality of leaves 13 of folded sheets of semipermeable membrane material 14 which each sandwich a sheet of feed carrier material 16; the discriminating or permeselective semipermeable surface faces inward, lying adjacent the feed carrier sheet. Four such leaves 13 are schematically depicted in FIG. 1 although it should be understood that a larger or smaller number of leaves could be employed depending upon the overall characteristics desired for the element. As depicted, all of the leaves are of the same length and have traditionally been cut from an extended length or roll of raw membrane material that has been fabricated with a desired width, e.g. about 40 inches. Typically, a roll of such semipermeable membrane material might be 2,000 yards long, and individual panels 30 that are cut therefrom for leaves (see FIG. 3) will vary from about 40 inches to 100 inches in length (which in its folded-over configuration would constitute a leaf from 20 to 50 inches long). These cut panels 30 of semipermeable membrane material are then folded about individual sheets 16 of feed carrier of the same width, which are similarly cut to appropriate lengths of about 20 to 50 inches. The feed carrier may be highly porous, woven, screening materials such as those sold under the trade name Vexar by Conwed Plastics.

Figure 5:
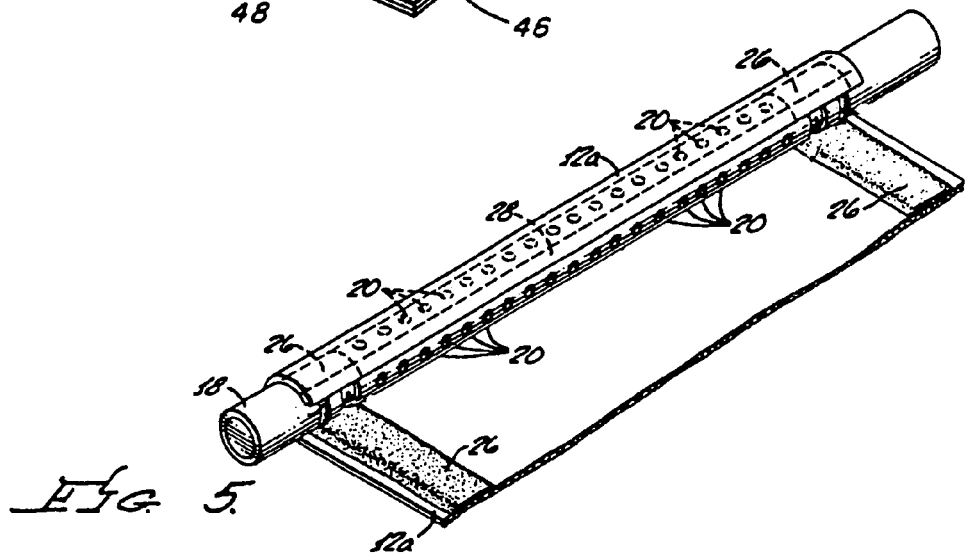
FIG. 5 is a perspective view of a portion of the assemblage of FIG. 1 showing, the attachment of just one sheet of permeate carrier to the central tube.

As depicted in FIGS. 1 and 2, the sandwiches 13 are then interleaved between a similar number of individual leaves of permeate carrier 12, e.g. Tricot polyester woven or knitted, rigidized material, one of which, i.e. 12a, is wrapped peripherally around the porous central tube 18, as further illustrated in FIG. 5. Once an assemblage is arranged as shown in FIG. 1 where four sandwiches 13 and four leaves of permeate carrier material 12 are illustrated, the assemblage is ready to be wrapped tightly about the central tube 18 as by rotating the tube, as well known in this art.

It is common, although not required, to use the arrangement best seen in FIGS. 2 and 5 where one slightly longer sheet 12a of permeate carrier material is first wrapped peripherally about the porous tube and secured thereto by the strips of adhesive 26 which, as described hereinafter, also serve to seal the parallel longitudinal edges of the permeate carrier 12 to prevent the intrusion of the liquid feed at either axial end of the spirally-wound element. O-rings may optionally be provided near the ends of the tube if desired. Sufficient adhesive 26 is provided so that it not only seals the permeate carrier material but soaks into the thin felt and porous base of the semipermeable membrane material to seal against flow inward through the longitudinal edges. The additional three lengths of permeate carrier 12 which are being interleaved with the leaf sandwiches 13 may, if desired, be adhesively joined or tacked to the outer surface of the leaf 12a that is wrapped about the hollow tube.

As earlier indicated, the membrane material may be any of the known semipermeable membrane materials currently used for cross flow filtration in spirally wound cartridges. These include UF membranes made of polysulfone or polyethersulfone, other asymmetric membranes such as cellulose acetate and cellulose triacetate, and thin film composite membranes of the various types, e.g. RO membranes and nanofiltration membranes. The invention is believed to have particular application to such thin film composite membranes, whereas asymmetric membranes have the potential for blistering at the interface between the scrim or felt backing material upon which the casting occurred. Composite membranes have not only this potential but also the potential for blistering at the interface between the porous polymeric base and the more selective thin film which, as previously indicated, may be interfacially formed thereon as by a condensation reaction.

Illustrated in FIG. 4 is an extended length section 40 of semipermeable membrane material 14 which may be fabricated, for example, by first casting a polyethersulfone ultrafiltration membrane 46 on a AWA polyester felt scrim material 48 and then employing it as a microporous base and creating an ultrathin film reverse-osmosis or nanofiltration membrane 47 atop this ultrafiltration base layer via an interfacial condensation reaction, as well known in the art. For example, the surface of the ultrafiltration base 46 may first be treated with an aqueous amine solution; subsequently, a reactive component such as a di- or triacylchloride in an organic solvent is applied to effect the condensation reaction, which results in the ultrathin film membrane, all as well known in this art. For example, polyamide thin film composite membranes, as taught in U.S. Pat. No. 4,277,344 to Cadotte, have been state-of-the-art reverse osmosis membranes for over a decade.

The illustrated extended length section 40 of semipermeable material would typically represent the end of a roll of such membrane material more than 1,000 yards long. Markings are shown on the extended length to depict two panels 30 that would be cut, each of which might have a width of about 40 inches and a length of about 70 inches so as to, when folded, provide a sandwich leaf 13 about 35 inches in length. The ends of each panel 30 are marked by a dotted line, and flanking that dotted line (where the transverse cut will take place) are a pair of transverse bands 41 of sealant which extend between the parallel longitudinal edges of the roll of material and are individually about 3 to 4 inches in width. Alternatively, a single band 6 to 8 inches in width may be laid down, which will be cut in half when the individual panels 30 are cut, one half being located at an end-seal on one membrane leaf and the other half being located at an end-seal for the following cut leaf. This would provide a typical coated end-seal region which is at least about 1 inch wide and preferably about 2 to 3 inches wide on each leaf after the element leaves are trimmed to obtain the final specified diameter for the element. As a result, the sealed region of the membrane surface will be aligned with the glued end seal region. Another transverse band 43 of sealant is applied at each location midway between the end seal bands 41; it is positioned in the region where the fold will take place to make the sandwich. Furthermore, the longitudinal edges of the semipermeable membrane material 14 each have a band or strip 45 of sealant which is at least about 1 inch wide, and preferably about 1-2 inches wide, applied therealong, where it will be essentially commensurate with the width of the glue lines that will be applied during the rolling operation.

Coating of the individual panels, before they are subsequently cut and folded to constitute the "bread" of the sandwiches that form the leaves 13, is advantageously carried out automatically or semiautomatically while the semipermeable membrane material is still part of the extended length or roll; such provides economy in fabrication. As previously mentioned, the application of the sealant closes these specific regions of the active membrane surface to permeate flow, and these are of course essentially commensurate with the regions where the downstream surface of the membrane is blocked to liquid flow either because of sealing at the fold region or because of adhesive applied at the edge or end seal regions. As a result of the application of this sealant, the effective or active membrane surface area for a panel 30 will be the two rectangular regions within the borders or perimeters delineated by these bands of sealant.

The sealant, which is applied to the upstream surface of the membrane material, can be any suitable material that will block liquid flow through this semipermeable material and that will dry or set in a time period suitable for production scheduling. Very generally, any sealant can be used which will effectively coat the upstream surface of an asymmetric membrane or of the discriminating layer of a composite membrane and prevent the diffusion of liquid through the permeselective surface that might be absorbed in the base membrane and would thus have the potential of later resulting in membrane blistering. The coating, for ease of fabrication, should not exhibit surface tackiness for any significant period of time, e.g. a minute or more, after its application and/or curing, so as not to adversely interfere with the rolling of spirally-wound membrane elements. However, such less desirable sealants, which initially remain tacky or sticky, might be used by rolling, stacking or otherwise storing with release paper until the sealant material has cured to a non-sticky coating. Examples of preferred suitable sealants that can be used to prevent flow through the membrane surface, include polymeric adhesive materials, such as traditional hot melt adhesives, UV-curable adhesives, chemically reacting components which generally form polymers, e.g. phenolic resins, polyvinyl alcohol resins, epoxy resins, urethane resins, silicone polymers; some solvents without added polymer will dissolve and densify the polymeric UF membrane and thereby seal the upstream membrane surface. These polymers and/or solvents will cure or dry, either with or without the application of heat, in an acceptable time period; for example, ketones, such as acetone and methyl ethyl ketone (MEK), are particularly good at sealing the surface of a polyethersulfone UF membrane. The required amount of sealant to be applied depends on the polymer and/or solvent used. The sealant may be applied to the extended length of material 14 using any commercially available coater, such as a slot die coater; usually such an adhesive is applied as a layer about 0.2-4 mils thick. One suitable sealant that has been employed is a liquid methacrylate prepolymer having epoxy functionality which is curable by the application of UV radiation; such a coating shows no sign of tackiness some 10 to 20 seconds after UV curing. Moreover, it is known that the epoxy functional groups slowly react, over about two days time, and thus provide resistance to high temperature chemical attack as might be experienced when the elements are exposed to harsh cleaning conditions.

Commercial hot melt adhesives have also been found to function quite well as sealants, and compositions that are used to coat fiberboard milk and juice containers and are thus already approved by the FDA are considered suitable. Examples of such hot melt adhesives include 3M Adhesive No. 3764, which is an ethylene-vinyl acetate polymer that includes polyethylene wax and paraffin wax; 3M Adhesive No. 3748, which is a copolymer of propylene, styrene-butadiene, ethylene-propylene and polyethylene combined with some paraffin wax; and 3M Adhesive No. 3792 (LM or HT) which are primarily ethylene-vinyl acetate polymers. These above-named hot melt adhesives are FDA approved and resistant to high temperature, e.g. about 80° C., which might possibly be encountered when cleaning with caustics or with acidic cleaners. When applied as 0.5-4.0 mil thick coatings, they exhibit low tack and low open time, which means that the surface can be touched nearly immediately after it has been coated onto the extended length or web 40 of semipermeable membrane material.

Commercial silicone polymers also work well as a sealant; they fill the membrane pores with polymer and have the added advantage of making the membrane surface very hydrophobic. FDA-approved Dow Corning Silastic(R) LSR 9481-40US and FDA-approved GE silicone SB200 in Isopar C-mineral spirits were successfully used as sealants. These polymers required a heat cure, and the manufacturer's recommendation to complete the reaction is 150° C. for 10-15 minutes. Although UV-curable silicone polymers are also available and work well, some may not be FDA-approved for food contact, thus potentially limiting their selection. Mixing GE Silicone parts A and B and then diluting the polymerizing mixture with Isopar G to 5-20% solids before coating has obtained good results. Depending on the method of coating being used, the polymer may be used as received from the vendor, or alternatively diluted down to about 1% or even below 1 weight % in a suitable solvent (e.g. Isopar, VM&P Naphtha or hexane). Such has been effectively used as a membrane sealant to prevent blisters in polyethersulfone UF dairy elements and also in RO membrane and nanofiltration membrane elements.

Examples of commercial urethanes that were effectively used to seal membrane surfaces include Fuller UR3543, Epmar EKL-53 and Henkel Loctite Hysol US0135. Urethanes were used as mixed or diluted with acetone or MEK. Although the standard mixed polymer worked well, diluted urethane solutions were often easier to apply and assure penetration into the membrane surface. A 10-50 weight % urethane in acetone solution coated nicely and effectively prevented blisters along the end seal and side seals in UF dairy elements.

Figure 3:
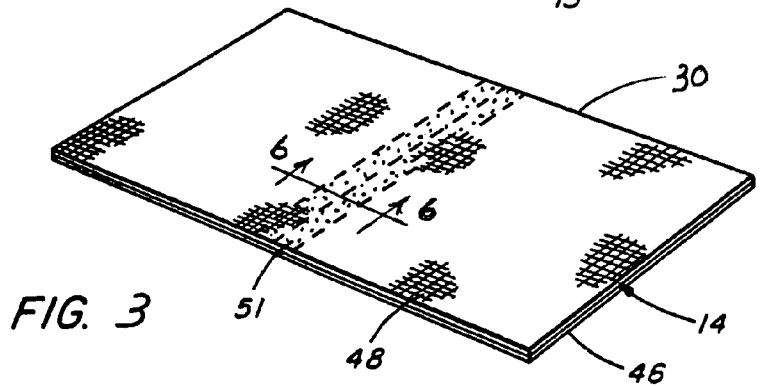
FIG. 3 is a perspective view of a flat panel of membrane material which has been cut to be used in the formation of a sandwich leaf and to which a band of adhesive has been applied in the region where the fold will occur.

The preferred method is to apply the sealant onto the membrane surface while the membrane is a part of a roll of extended length; however, as described hereinafter, sealants can be applied to the membrane surface after the element is rolled as well, by unrolling and re-rolling the element. Once the bands of sealant have been applied, the roll or extended length of membrane material is cut or sheeted into the panels 30 that will be used in the formation of the sandwich leaves 13. One such panel is illustrated in FIG. 3 where the undersurface of the semipermeable membrane material 14, i.e. the scrim sheet 48, which will constitute the outer surfaces of the folded sandwich leaf, is shown as facing upward. This allows illustration of the leakage protection 51 that is desirably applied to the functional downstream surface of the membrane in the region of the fold as generally described in the '736 patent.

As a result of folding the membrane material 14 with the discriminating surface layers 47 facing each other, there may be some buckling of the permeselective membrane layer at the inside surface of the fold which could result in subsequent crack formation as a consequence of long duration of use and frequent cleaning. As mentioned hereinbefore, this difficulty was addressed in the '736 patent, and consistent therewith, a band 51 of polyurethane adhesive 1 to 2 inches wide is preferably applied to the downstream surface, i.e., the polyester felt, at the midpoint of the leaf where the fold will occur, stretching from one longitudinal edge to the other. This polyurethane material 51 effectively fills the void of the polyester felt scrim material, preferably penetrating up to and perhaps slightly into the associated porous base layer; moreover, it remains flexible in the region of the fold at operational and cleaning temperatures. It has now also been found that Applicant's coating of the membrane upstream surface with sealant protection against blisters may also provide significant protection against polymer embrittlement and cracking such as has been heretofore caused by chlorine and caustic cleaning; as a result, it may render unnecessary future application of downstream protection that has heretofore been applied in the fold region for over a decade.

Once the panel 30 had been so protected at the permeate output surface, the fabrication/rolling of the spirally-wound element would take place in the traditional manner. As well known in this art (see the '736 patent), and as illustrated in FIG. 5 for a single sheet of permeate carrier, bands 26 of adhesive are applied along the side edges and the end edges of each of the leaves of permeate carrier in sufficient quantity so as to totally saturate the thickness of the permeate carrier. As a result, this adhesive seals the three edges thereof and also penetrates into and seals the usually thinner scrim layers at the outer surfaces of each of the four membrane leaves 13, which are interleaved between the four radially extending leaves of permeate carrier 12 as depicted in FIG. 1.

When winding takes place, the crease of the folded membrane 14 with its sandwiched feed carrier sheet 16 will be in the nip between the leaves 12 of permeate carrier, with the crease being located near the initially wrapped central tube 18. As the tube is rotated during this fabrication, a spiral winding is formed, and the porous permeate carrier 12 becomes secured along both of its surfaces to the adjacent scrim layers 48 of the folded semipermeable membrane material 14 via the adhesive bands 26. Once the winding of the assemblage is complete, a further band of such adhesive that is laid down along the end edge of each permeate carrier sheet 12 effects the complete sealing of three edges of each permeate carrier sheet so the only exit therefrom is at the spirally inward edge adjacent the porous tube 18. Of course, the only entry to the permeate sheets is via the discriminating membrane which faces the feed carrier sheet 16.

As an alternative to applying the sealant prior to rolling the element, an element may be rolled in the standard manner, as generally described in the '736 patent, and sized for an acceptable circumference. The element is then unrolled to open the leaves, and the end seals and side seals of the opened polyethersulfone UF dairy element are treated with a suitable sealant, e.g. a polyurethane adhesive, a solution of polyurethane adhesive in acetone, or acetone alone, to seal the membrane to fluid penetration in the regions above each glue line region. For each leaf, the corresponding feed spacer may be pulled toward the operator, and a clamp attached to it to prevent it from flapping back over the element. Acetone is applied with a soaked cotton sponge; for example, a cotton applicator of pliable spherical shape has been found useful for coating the pre-glued leaves. After dipping such a cotton applicator in a solution of about 50 weight % urethane adhesive in acetone (urethane/acetone), it is wrung out to prevent dripping the solution onto an active region of the membrane. After first coating the side edge surfaces along band that preferably has a width equal to the width of the underlying glue band that has been applied to the permeate carrier sheets 12, the applicator is then used to treat the front side of the membrane in the region where the end seal is made to assure that the entire membrane surface is sealed above the glued area. The membrane leaf may then be pulled toward the operator, and the opposite membrane surface, along the side and end edge surfaces above the glued areas, is similarly sealed using the urethane/acetone. This process of clamping the feed spacer, and sealing the front and back membrane surfaces is repeated for each leaf in the element. To re-roll the treated element, a vacuum is applied to the center tube of the element to prevent the membrane from wrinkling during the re-rolling operation.

After the final turn is taken to complete the winding of the element, it is generally secured by helically wrapping plastic tape or the like about the entire exterior of the element. As also known in the art, a thin outer region of feed carrier can be provided by using one sheet of feed carrier 16 that is extended in length by an amount to cover the circumference of the tubular element, should such an arrangement be desired.

To illustrate one problem which is solved by the invention, FIG. 7 is provided which is a fragmentary view of a sheet of membrane material which was part of a prior art spiral wound element, wherein prime reference numbers are used to identify the elements corresponding to those hereinbefore described. Shown is semipermeable membrane material 14', the scrim sheet layer 48' of which has likewise been filled with polyurethane adhesive 51' as would have been done in the fold region; the adhesive penetrates to the undersurface of the microporous base layer 46'. In such a prior art arrangement, liquid would permeate through the entire surface of the discriminating layer 47'; however, in the region where downstream flow is blocked, it could go no further. As a result, there was the possibility that, over extended periods of use, permeate accumulating in the microporous layer 46' might cause a blister 50' to occur as a result of separation of the ultrathin discriminating layer 47' from the base layer upon which it was interfacially formed, as shown in FIG. 7. In composite membrane elements, separation can sometimes occur either between the dense discriminating upstream surface layer and its supporting asymmetrically-formed microporous polymer structure or between the polymeric supporting membrane and the polypropylene or polyester substrate backing or scrim sheet, whereas in ultrafiltration elements the latter would be the separation potential region. It is this potential problem, in the fold region and along the side and end edges of the leaves, that is primarily addressed and overcome by the present invention.

Although the invention has been described with regard to the preferred embodiments which constitute the best mode presently known to the inventor for carrying out this invention, it should be understood that various changes and modifications as would be obvious to those having the ordinary skill in the art may be made without departing from the scope of the invention which is set forth in the claims appended hereto. For example, although the description of the cross flow elements are described as using Tricot polyester woven material as a permeate carrier and using a Vexar spacer material as a feed carrier, it should be understood that any of the multitude of materials that have been used for this purpose over the past two decades for spirally-wound cross flow membrane elements may be instead employed. Likewise, although polyamide thin film composite membranes and polysulfone and polyethersulfone UF membranes were mentioned in detail as the membrane materials, it should be understood that other such selective polymeric films, including those interfacially formed on the surface of the microporous layer, which have been developed for nanofiltration and reverse-osmosis purposes, can alternatively be employed. Likewise, although the preferred microporous base layer is one which would also function as a polysulfone or a polyethersulfone UF membrane, other such microporous materials, such as have been developed for microporous operations, can alternatively be employed. Generally, elements employing ultrafiltration, RO, or nanofiltration membrane materials can benefit from the invention. The disclosures of all U.S. patents hereinbefore mentioned are expressly incorporated herein by reference.

Particular features of the invention are set forth in the claims that follow.

The invention claimed is:

1. A method for preventing osmotic blistering in spirally-wound elements made of semipermeable membrane sheet material having an upstream surface and a downstream surface, in locations otherwise subject to such blistering, which method comprises:
applying a sealant to the upstream surface of the membrane sheet material in locations adjacent its longitudinal edge surfaces and its end edge surfaces and in a surface region midway its ends where the downstream surface has been, or will be, treated so that flow from the downstream surface of the membrane material is prevented, which sealant prevents liquid from permeating into the membrane in such regions which might otherwise potentially result in osmotic blistering.

2. The method according to claim 1 wherein said membrane material includes a supporting microporous base layer and a semipermeable discriminating layer, which has its downstream surface supported upon and in contact with said base layer, wherein the membrane sheet material has a longitudinal length which allows it to be folded upon itself at said midway region to sandwich a feed layer therebetween, and wherein the downstream surface of said base layer is treated in the region of the planned fold to prevent leakage therethrough should cracking of the discriminating layer subsequently occur.

3. The method according to claim 2 wherein said sealant is applied to the upstream surface of the discriminating layer in strips at least about 1 inch wide across the region of the fold and along both longitudinal edge surface regions and both end surface regions thereof where the base layer will be adhesively attached to an associated permeate-carrying sheet in forming a spiral-wound element.

4. The method according to claim 1 wherein the sealant is a polymeric adhesive or a hot-melt adhesive.

5. The method according to claim 4 wherein the sealant is a hot-melt adhesive that solidifies within no more than about 10 seconds after application to the membrane sheet material at ambient temperature.

6. The method according to claim 1 wherein the membrane is made of polymeric material and the sealant is a solvent for said polymeric membrane material and is applied in sufficient amount to dissolve said membrane upstream surface and upon evaporation leave a dense polymeric layer that prevents liquid permeation.

7. A method for preventing osmotic blistering in spirally-wound elements of folded semipermeable membrane sheet material, which folded membrane material comprises a UF membrane, which method comprises:
treating the downstream surface of said UF membrane in a region of the fold to prevent leakage therethrough as a result of subsequent cracking of the membrane, and
applying bands of a sealant to the upstream surface of the semipermeable membrane sheet material at locations adjacent its longitudinal edge surfaces and its end edge surfaces and in a surface region midway its ends in the region of the fold to prevent liquid from permeating into the membrane in such regions and potentially causing blistering.

8. The method according to claim 7 wherein said bands of sealant are at least about one inch in width and wherein said bands which are applied to the upstream surface of the semipermeable membrane sheet material along both longitudinal edge surfaces thereof that are opposite regions where there will be adhesive attachment of the UF membrane to an associated permeate-carrying sheet are of a width essentially commensurate with the width of said adhesive attachment.

9. The method according to claim 7 wherein said membrane material comprises an RO or nanofiltration thin discriminating layer disposed on the upstream surface of said UF membrane, with said sealant being applied to the surface of said discriminating layer in bands at least about one inch in width.

10. A method for making spirally wound semipermeable membrane elements that are resistant to osmotic blistering, which method employs semipermeable membrane sheet material made according to the method of claim 9 and comprises the steps of:
providing an extended length of the membrane sheet material, sufficient to provide a plurality of folded leaves for spiral winding, which material includes a supporting microporous base layer upon which said UF membrane is supported with its downstream surface in contact with said base layer,
said sealant bands being applied to the upstream surface of the UF membrane at said plurality of spaced apart locations along said extended length, including said locations where each of said plurality of leaves would be folded,
cutting said extended length into a plurality of panels for folding to create said leaves, each of which panels has two substantially rectangular active surface regions which are bordered by said bands of sealant,
folding each of said plurality of panels and inserting a sheet of porous feed material within the folded sheet to create one leaf, and
winding said plurality of leaves spirally about a hollow central tube to create a cross-flow separation element.

11. The method according to claim 10 wherein sheets of porous permeate carrier material and said folded leaves are interleaved prior to said winding step so as to provide separate permeate pathways in said wound element leading to said hollow tube.

12. The method according to claim 11 wherein strips of adhesive are applied so as to seal the edges of said permeate carrier sheets to prevent edgewise liquid flow into said permeate pathways and to join the downstream surfaces of the longitudinal edge regions of said microporous base layer to the adjacent edge regions of the permeate carrier sheets and to likewise seal said base layer, and wherein said widths of said sealant bands are essentially commensurate with the widths of said adhesive strips.

13. A spirally wound liquid separation element which comprises:

a plurality of leaves of sheet-like semipermeable membrane material which includes a supporting microporous base layer and a semipermeable discriminating layer, which has an upstream surface and a downstream surface with its downstream surface being in surface-to-surface contact with said base layer, each of said leaves being folded upon itself, a porous feed material sheet sandwiched between facing upstream surfaces of each said folded leaf, porous permeate carrier material associated with and flanking each of said folded leaves, said membrane material having adhesive means treating the microporous base layer adjacent the downstream surface in regions which blocks flow into said permeate carrier in said regions, said blocked regions being located along both longitudinal edge regions thereof, along both end edge regions of the folded leaf and in the region of each fold, and a sealant layer along the upstream surface of the membrane across regions that are essentially commensurate in size with said blocked regions to prevent liquid from permeating through the membrane toward said permeate carrier material in such regions that might cause osmotic blistering.

14. The element according to claim 13 wherein the sealant layer is a solidified polymeric adhesive or a solidified hot-melt adhesive.

* * * * *